United States Patent
Piper

[15] 3,637,519
[45] Jan. 25, 1972

[54] METHOD FOR THERMALLY REFINING PRECIPITATED HALOAPATITES

[72] Inventor: Roger D. Piper, Des Peres, Mo.
[73] Assignee: Mallinckrodt Chemical Works, St. Louis, Mo.
[22] Filed: July 22, 1969
[21] Appl. No.: 843,462

[52] U.S. Cl. ..................................................252/301.4 P
[51] Int. Cl. .........................................................C09k 1/36
[58] Field of Search ................................252/301.4, 301.4 P

[56] References Cited

FOREIGN PATENTS OR APPLICATIONS 717,653   10/1954   Great Britain......................252/301.4

*Primary Examiner*—Tobias E. Levow
*Assistant Examiner*—J. Cooper
*Attorney*—Koenig, Senniger, Powers & Leavitt

[57] ABSTRACT

Precipitated alkaline earth haloapatites containing antimony as an activator are thermally refined by heating them first to a temperature of at least 800° C. in an oxidizing atmosphere to remove ammonia and water without reducing the antimony. Thereafter, the haloapatites may be further thermally refined by being heated at 1,050°–1,200° C. in an inert atmosphere to complete the refining treatment. This method avoids loss of antimony and other activators and produces a significantly brighter phosphor product.

4 Claims, 2 Drawing Figures

PHOSPHOR PRODUCT

PHOSPHOR PRODUCT 3,637,519

METHOD FOR THERMALLY REFINING PRECIPITATED HALOAPATITES

BACKGROUND OF THE INVENTION

The invention relates to the field of inorganic chemistry and, more particularly, to the purification of precipitated alkaline earth haloapatites containing antimony as an activator.

Various processes for precipitating luminescent alkaline earth haloapatites from solution are known. For example, one such process is disclosed in my copending, coassigned application Ser. No. 822,099, filed Apr. 28, 1969.

These haloapatites are used in manufacturing phosphors for coating fluorescent lamp tubes. To achieve maximum brightness, the precipitated haloapatite must be thermally refined by being heated in an inert atmosphere at a temperature of 1,050°–1,200° C. for a short period of time. This thermal refining treatment serves to correct defects in the haloapatite host lattice and increase the size of the individual crystallites.

It has been found that during this thermal refining treatment, there is some loss of the antimony activator. These precipitated haloapatites normally contain some ammonium ions. During the thermal refining treatment, the ammonia appears to dissociate and reduces some of the antimony to metallic antimony. The resulting loss of trivalent antimony is costly and the presence of metallic antimony causes an unattractive and undesirable grey color in the finished phosphor. Prolonged heating at 1,050°–1,200° C. is necessary to volatilize this reduced antimony. If, on the other hand, the haloapatite is heated in an oxidizing atmosphere so as to prevent this reduction, manganese present as a secondary activator is oxidized to a higher valence. Not only is this oxidized manganese inert as an activator, but it also causes a pink color which adversely affects the appearance and brightness of the finished phosphor.

SUMMARY OF THE INVENTION

Among the objects of the invention may be mentioned the provision of an improved method for thermally refining precipitated alkaline earth haloapatites containing antimony as an activator; the provision of such a method which effectively avoids the loss of antimony and manganese as activators; and the provision of a method of the type indicated which may be carried out either on a batch or continuous basis and which permits the production of brighter phosphors. Other objects and features will be in part apparent and in part pointed out hereinafter.

The present invention is thus directed to a method for thermally refining precipitated alkaline earth haloapatites containing antimony as an activator which comprises heating such haloapatites in an oxidizing atmosphere at a temperature of at least approximately 800° C. In an additional embodiment of the invention, the precipitated alkaline earth haloapatite is heated in an oxidizing atmosphere in a first stage at a temperature of at least approximately 800° C. and is thereafter heated in an inert atmosphere at a temperature between about 1,050° and about 1,200° C.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
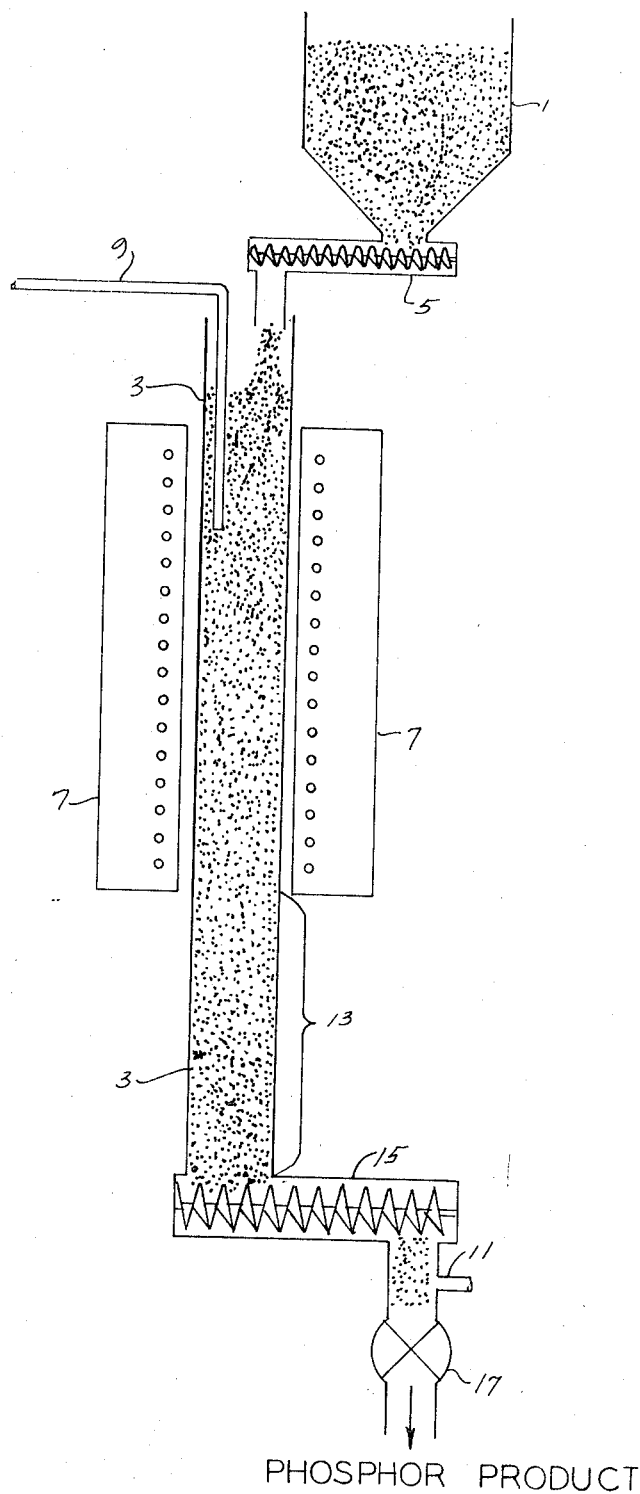
FIG. 1 is a diagrammatic representation of apparatus for carrying out the method of the invention.

The present invention is applicable to the purification of any precipitated haloapatite containing antimony as an activator and which also contains ammonium ions or other impurities which may act as reducing agents at elevated temperatures. It is particularly useful, however, for the purification of alkaline earth halophosphates that have been precipitated from solutions containing ammonium salts. One such method is described in example 5 of my aforementioned copending application.

In accordance with the invention, it has been found that if the halophosphate is first heated in an oxidizing atmosphere, such as air, at a temperature above about 800° C., preferably about 800°–850° C., water and ammonium ions are removed without concomitant reduction of antimony. It is desirable not to heat the material above about 850° C. in the presence of air in order to avoid oxidizing the manganese. However this upper limit is not essential since the manganese will revert to the desired divalent state when the material is heated to 1,050°–1,200° C. in an inert atmosphere such as nitrogen or carbon dioxide.

For example, an oven-dried material prepared according to example 5 of my aforementioned copending application Ser. No. 822,099 was crushed, screened, and divided into two portions. The procedure of example 5 of application Ser. No. 822,099 is as follows: A 267-gallon polyethylene cone-bottomed tank having a diameter of 39½ inches was employed as the precipitation tank or reaction vessel. At the start of precipitation, the depth of precipitation medium in the tank was 4¼ inches. At the completion of precipitation, the depth of reaction medium in the tank was 34½ inches. These depths were measured along the tank wall.

The impeller used for stirring was a stabilized 'Lightnin" type three-bladed (nominal 6-in. diameter) propeller agitator coated with polyvinylchloride having the following characteristics:
diameter—6⅝ inches
blade length—2¼ inches
blade width—2⅛ inches
impeller pitch—5¼ inches The impeller was positioned 2 inches off the tank bottom and rotated at a speed of 260 r.p.m.

The compositions and molar proportions of the reactant solutions and the initial composition of the precipitation medium were as follows:

| | Moles |
|---|---|
| First reactant solution: | |
| $CaCl_2$ | 487.76 |
| HCl | 85.68 |
| $Sb_2O_3$ | 2.820 |
| $SrCO_3$ | 5.033 |
| $CdCO_3$ | 5.145 |
| $MnCO_3$ | 9.682 |
| Water to make (gal.) | 46.2 |
| Second reactant solution: | |
| $H_3PO_4$ | 303.93 |
| $NH_3$ | 1,070.96 |
| $NH_4F$ | 89.29 |
| Water to make (gal.) | 95.0 |
| Initial precipitation medium: | |
| $NH_4Cl$ | 381.60 |
| Second reactant solution (gal.) | 3.17 |
| Water to make (gal.) | 33.0 |

The first or cation reactant solution was directed down the tank wall and into the precipitation medium at the least-stirred point in the tank and the second or anion reactant solution was introduced into the tank in the region of maximal dispersion (see FIG. 3).

The total anion solution was 95 gallons and feed time was 4 hours giving an average anion solution addition rate of 0.396 gal./min. The total cation solution was 46.2 gallons and the feed time was 3 hours, 52 minutes, giving an average cation solution addition rate of 1.99 gal./min.

The anion solution was started 8 minutes before the cation solution. Therefore, the initial precipitation medium contained about 3.17 gallons of the anion solution (about 3.3 percent) at the start of precipitation. In addition, the initial precipitation medium also was made up of 20.411 kg. $NH_4Cl$ (381.60 moles) in sufficient water to make 29.83 gallons (total volume in tank at start of cation addition was 33.0 gallons).

The precipitation was carried out at a temperature of 55° C.

Portion A was placed in an open quartz crucible about 8 cm. in diameter by 8 cm. deep and thermally refined in a preheated muffle furnace at 800°–850° C. for 1 hour in the presence of air. After cooling, the product was brushed through a 325-mesh screen and loaded into quartz boats about 4 cm. deep by 4 cm. wide by 20 cm. long. These boats were pushed through a tube furnace 42 inches long countercurrent to a slow flow of nitrogen. A push rate of 0.6 cm./min. was used, and temperature zones in the furnace were arranged so that this push rate gave a heating rate of about 50° C. per minute and a residence time in the 1,125°–1,175° C. zone of the furnace of about 10 min. The boats were allowed to cool in nitrogen before removal of the product and final crushing and screening to −325 mesh. Portion B of the oven-dried material thus prepared was treated similarly except the step of thermal refining in air was omitted. Results are shown in table I.

The method of the present invention may be used alone or in combination with various other finishing procedures such as further heating, milling, classifying, chemical washes, etc. For example, after the material has been subjected to the oxidative heating treatment of the present invention, it may be subjected to further thermal refining, e.g., heating at 1,050°–1,200° C. in an inert atmosphere, without any other intermediate treatment. In other instances, it may be subjected to further chemical treatment such as a nitric acid wash after the final thermal refining treatment as in the following example.

A procedure similar to that previously described was applied to a different, smaller particle size, batch of material prepared in accordance to the process disclosed in my aforementioned copending application. Also, the product was given a dilute nitric acid wash after thermal refining. This consisted of stirring 1 kg. of the phosphor product with 4 l. water and 38 ml. conc. $HNO_3$ for 30 minutes, filtering, washing thoroughly with water, and drying at 120° C. The product is identified in table I as C. Material D was treated similarly except that the preliminary oxidative treatment in air was omitted.

TABLE I

| Material | Treatment | Sb(%) |
| --- | --- | --- |
| A | Two-stage | 0.99 |
| B | Normal | 0.81 |
| C | Two-stage | 0.90 |
| D | Normal | 0.78 |

Sb(%) represents the amount of antimony found in the respective materials A, B, C, and D treated as described above.

Standard 40-watt fluorescent lamps were coated with the above phosphors by conventional methods. After 100 hours operation, the brightness of the lamps made from phosphors A and C, which had been treated according to the present invention, were approximately 50 lumens greater than that of lamps made from phosphors B and D which had not been so treated. An increase of 50 lumens is considered to be significant improvement in brightness.

The method of the present invention may be carried out on a batch basis as described above or the oxidative heat treatment may also be combined with conventional thermal refining as the first stage of a two-stage thermal refining process carried out on a continuous basis. Apparatus for this purpose is diagrammatically shown in FIG. 1. As shown, the precipitated haloapatite to be refined is fed continuously from a feed hopper 1 to the upper end of a quartz or ceramic tube 3 by means of an auger or feed screw 5. The tube 3 is surrounded by furnace 7 adapted to heat the material moving through the tube to a maximum temperature of 1,050°–1,200° C. An air inlet 9 is provided at the upper end of the tube 3 for introducing air into the bed to provide an oxidizing atmosphere in the region where the temperature is maintained above at least 800° C. Nitrogen is continuously introduced under sufficient pressure through a suitable inlet 11 at the lower end of the apparatus so as to maintain an inert atmosphere in the tube in the region of the lower end of the furnace 7 where the temperature is above 850° C., preferably between 1,050° and 1,200° C. Following the two-stage thermal refining treatment, the treated material or phosphor passes through a cooling zone designated 13 and is continuously withdrawn from the apparatus by means of auger 15 and seal valve 17.

Figure 2:
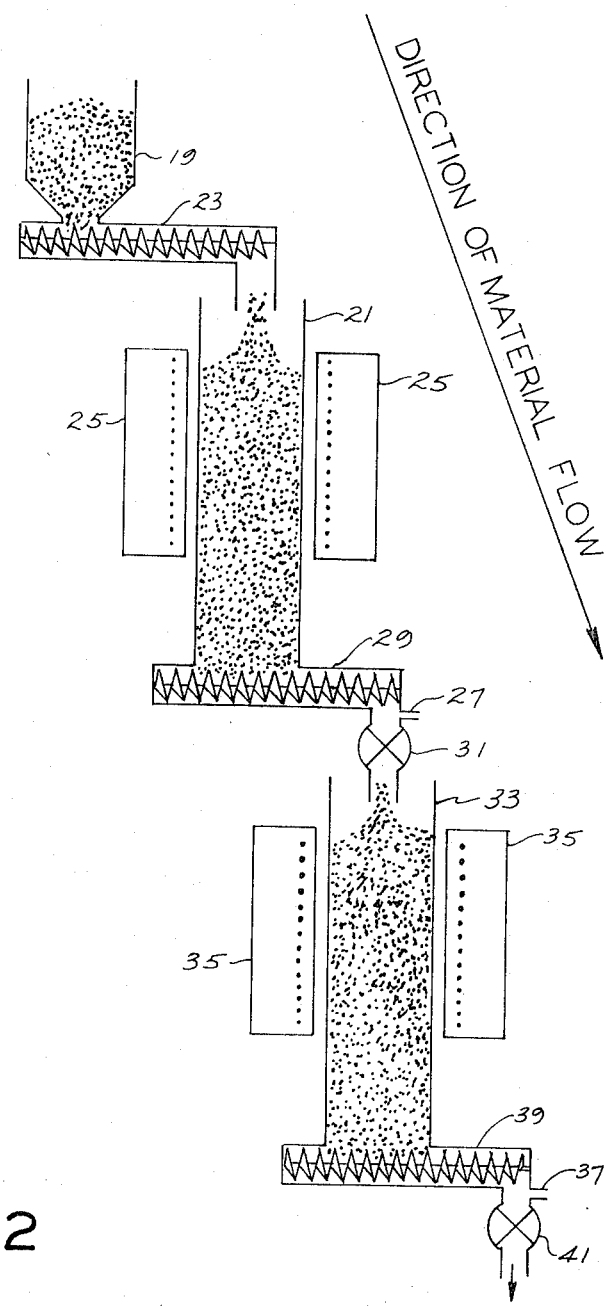
FIG. 2 is a diagrammatic representation of an alternative form of apparatus for carrying out the method of the invention.

Alternatively, two furnaces of the type described above may be operated in series, as diagrammatically shown in FIG. 2. As shown, the precipitated haloapatite to be refined is fed continuously from a feed hopper 19 to the upper end of a first quartz or ceramic tube 21 by means of an auger 23. The tube 21 is surrounded by a first furnace 25 adapted to heat the material moving through the tube to a temperature of at least 800° C. An air inlet 27 is provided to supply air or other oxidizing atmosphere to tube 21. The material subjected to the oxidative heat treatment in tube 21 is continuously withdrawn by means of an auger 29 and seal valve 31 and fed directly into a second quartz or ceramic tube 33. This tube is surrounded by a second furnace 35 adapted to heat the material moving through the tube to a temperature of 1,000°–1,200° C., preferably 1,100°–1,200° C. Inlet 37 is provided for supplying nitrogen or other inert gas to tube 33. After treatment in tube 33, the treated material or phosphor is continuously withdrawn from the apparatus by means of auger 39 and seal valve 41.

It will be evident from the foregoing that the usefulness of the present invention is not limited to thermal treatment of haloapatite phosphors, but it is generally applicable to thermal treatment of any antimony-activated phosphor from which it is desired to remove volatilizable substances which may, at elevated temperatures, act as reducing agents for antimony.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

I claim:
1. A method of thermally refining precipitated alkaline earth haloapatites containing antimony and manganese as activators, which haloapatites have been precipitated in the presence of ammonium ions, comprising first heating the said haloapatites in an oxidizing atmosphere at a temperature of at least 800° C. and subsequently heating the said haloapatite in an inert atmosphere at a temperature between about 1,050° C. and about 1,200° C.

2. The method according to claim 1 wherein the oxidizing atmosphere is air.

3. A method of thermally refining precipitated alkaline earth haloapatite material containing antimony and manganese as activators which haloapatite material has been precipitated in the presence of ammonium ions comprising continuously moving said material through a furnace, heating said material to a temperature of at least 800° C. in a first zone of said furnace in which is maintained an oxidizing atmosphere, and thereafter heating the material to a temperature between about 1,050° C. and about 1,200° C. in a second zone of said furnace in which is maintained an inert atmosphere.

4. The method according to claim 3 wherein the two heating steps are carried out in separate furnaces operated in series.

* * * * *